United States Patent
Blaettler et al.

(10) Patent No.: US 12,122,446 B2
(45) Date of Patent: Oct. 22, 2024

(54) FEEDBACK ACTUATOR FOR A STEERING DEVICE OF A MOTOR VEHICLE

(71) Applicants: thyssenkrupp Presta AG, Eschen (LI); thyssenkrupp AG, Essen (DE)

(72) Inventors: Simon Blaettler, Grabs (CH); Robert Galehr, Schaanwald (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 94 days.

(21) Appl. No.: 17/775,176

(22) PCT Filed: Nov. 5, 2020

(86) PCT No.: PCT/EP2020/000187
§ 371 (c)(1),
(2) Date: May 6, 2022

(87) PCT Pub. No.: WO2021/089180
PCT Pub. Date: May 14, 2021

(65) Prior Publication Data
US 2022/0388564 A1    Dec. 8, 2022

(30) Foreign Application Priority Data
Nov. 8, 2019    (DE) ..................... 10 2019 217 279.2

(51) Int. Cl.
*B62D 1/185*    (2006.01)
*B62D 1/181*    (2006.01)

(52) U.S. Cl.
CPC ............. *B62D 1/185* (2013.01); *B62D 1/181* (2013.01)

(58) Field of Classification Search
CPC ......... B62D 5/006; B62D 1/181; B62D 1/185
See application file for complete search history.

(56) References Cited

U.S. PATENT DOCUMENTS

| | | | |
|---|---|---|---|
| 2016/0207565 A1 | 7/2016 | Maier et al. | |
| 2017/0197652 A1 | 7/2017 | Uchibori | |

(Continued)

FOREIGN PATENT DOCUMENTS

| | | | |
|---|---|---|---|
| CN | 105324293 A | 2/2016 | |
| CN | 106965847 A | 7/2017 | |

(Continued)

OTHER PUBLICATIONS

Daniel Kreutz, Feedback Actuator for a Steering Device, Jan. 19, 2017, EPO, WO 2017/009125 A1, Machine Translation of Description (Year: 2017).*

(Continued)

*Primary Examiner* — James A English
(74) *Attorney, Agent, or Firm* — thyssenkrupp North America, LLC

(57) ABSTRACT

A feedback actuator for a steering device of a motor vehicle may include a casing unit that has an outer casing that can be attached to a motor vehicle and an inner casing received therein such that the inner casing is telescopically adjustable in a longitudinal direction, a steering spindle mounted in the inner casing such that the steering spindle is rotatable about a longitudinal axis, and an electric motor of a drive unit arranged in an interior space of the casing unit. The electric motor may have a stator that is fixed on the outer casing and a rotor that can be driven rotationally. A rotor shaft may be coaxial with respect to the longitudinal axis and coupled via a gear mechanism to the steering spindle.

11 Claims, 3 Drawing Sheets

(56) References Cited

U.S. PATENT DOCUMENTS

| | | | | |
|---|---|---|---|---|
| 2018/0154925 A1* | 6/2018 | Steinkogler | ............ | F16D 27/108 |
| 2018/0319419 A1* | 11/2018 | Kreutz | ................... | B62D 1/181 |
| 2020/0189649 A1* | 6/2020 | Polmans | ................. | F16C 41/00 |
| 2020/0346682 A1* | 11/2020 | Forte | ....................... | B62D 5/006 |

FOREIGN PATENT DOCUMENTS

| | | | | | |
|---|---|---|---|---|---|
| CN | 108367771 | A | | 8/2018 | |
| CN | 109153406 | A | | 1/2019 | |
| DE | 10033810 | A1 | | 1/2002 | |
| DE | 10 2015 213 303 | A1 | | 1/2017 | |
| DE | 102018101528 | A1 | | 7/2019 | |
| JP | H01106773 | A | | 4/1989 | |
| JP | 2007320537 | A | | 12/2007 | |
| JP | 2013216172 | A | | 10/2013 | |
| WO | WO-2015086841 | A1 | * | 6/2015 | ............ B62D 5/008 |
| WO | WO-2017009125 | A1 | * | 1/2017 | ............ B62D 5/006 |
| WO | 2019145281 | A1 | | 8/2019 | |

OTHER PUBLICATIONS

Siegmar Gilges, Vehicle Steering System With a Superimposing Actuator, Jun. 18, 2015, EPO, WO 2015/086841 A1, Machine Translation of Description (Year: 2015).*

Bohner et al., Motor vehicle steering colun has output shaft that can be displaced relative to steering spindle in axial displacement range consisting of adjustment range, emergency displacement range, Jan. 31, 2002, EPO, DE 10 033 810 A1, Machine Translation of Description (Year: 2002).*

Hirotaka Fukushima, Steering Device, Oct. 24, 2013, EPO, JP 2013-216172 A, Machine Translation of Description (Year: 2013).*

English Translation of International Search Report issued in PCT/EP2020/000187, dated Apr. 13, 2021.

\* cited by examiner

FEEDBACK ACTUATOR FOR A STEERING DEVICE OF A MOTOR VEHICLE

CROSS REFERENCE TO RELATED APPLICATIONS

This application is a U.S. National Stage Entry of International Patent Application Serial Number PCT/EP2020/000187, filed Nov. 5, 2020, which claims priority to German Patent Application No. DE 10 2019 217 279.2, filed Nov. 8, 2019, the entire contents of both of which are incorporated herein by reference.

FIELD

The present disclosure generally relates to motor vehicle steering systems, including feedback actuators for steering devices of motor vehicles.

BACKGROUND

Steer-by-wire steering systems for motor vehicles receive manual steering commands of the driver such as conventional mechanical steering operations by way of rotation of a steering wheel of an input unit, which steering wheel is attached at the driver-side, rear end of a steering spindle. The steering spindle is not, however, connected mechanically via the steering gear to the wheels to be steered, but rather interacts with rotary angle and/or torque sensors which detect the introduced steering command and output an electric control signal determined therefrom to a steering actuator which sets a corresponding steering lock of the wheels by means of an electric actuating drive.

In the case of steer-by-wire systems, the driver does not receive direct physical feedback from the steered wheels via the steering line, which is fed back, in the case of conventional mechanically coupled steering systems, to the steering wheel as a reaction or restoring torque in a manner which is dependent on the roadway condition, the vehicle speed, the current steering angle and further operating states. The absence of haptic feedback makes it more difficult for the driver to reliably detect current driving situations and to carry out appropriate steering maneuvers, as a result of which the vehicle steering capability and therefore the driving safety are impaired.

In order to generate a realistic driving feeling, it is known in the prior art to detect parameters such as vehicle speed, steering angle, steering reaction torque and the like from an actual instantaneous driving situation or to calculate them in a simulation, and to form a feedback signal therefrom, which feedback signal is fed into a feedback actuator. The feedback actuator is integrated into the input unit and has an actuator unit which comprises a manual torque actuator or steering wheel actuator with a drive unit which, in a manner which is dependent on the feedback signal, couples a restoring torque (feedback torque) which corresponds to the real reaction torque into the steering wheel via the steering spindle. "Force feedback" systems of this type give the driver the impression of a real driving situation as in the case of a conventional steering system, which facilitates an intuitive reaction.

DE 10 2015 213 303 A1 has disclosed a feedback actuator of the generic type as mentioned at the outset. It comprises a casing unit with an inner shell (also called an inner casing tube or internal casing tube), in which the steering spindle is mounted such that it can be rotated about the longitudinal axis, at the rear (with regard to the driving direction) end of which steering spindle, which faces the driver, the steering wheel is attached. The inner casing is received in an outer casing (also called an outer casing tube or a guide bracket) such that it can be displaced axially in a telescopic manner in the longitudinal direction, that is to say in the direction of the longitudinal axis. As a result, a length adjustment of the steering wheel can take place, and the inner casing can be retracted as far as possible into the outer casing toward the front in the driving direction, in order for it to be possible for the steering column to be stowed as compactly as possible in the vehicle interior compartment, for example during autonomous driving operation.

The drive unit of the actuator comprises an electric motor which is accommodated in the casing unit coaxially with respect to the longitudinal axis together with a gear mechanism in an advantageously compact arrangement which saves installation space. Here, the stator is fixed axially and non-rotationally in the inner casing. As a result of the known arrangement within the inner casing, the entire drive unit together with the inner casing is moved axially relative to the outer casing during adjusting and stowing. As a result, during the length adjustment, the entire inert mass of the drive unit has to be accelerated, with the result that a relatively high drive power is required for rapid retraction and extension. Moreover, the electric supply lines have to be of movable configuration, in order to be able to follow the relative movement of the inner casing during adjusting. Moreover, the installation space which is available for the gear mechanism in the interior space of the inner casing is tightly limited, with the result that the design of the gear mechanism is restricted and/or technically complex.

Thus, a need exists to improve the operating properties and the structural adaptation possibilities for feedback actuators for steering devices of motor vehicles.

DETAILED DESCRIPTION

Figure 1:
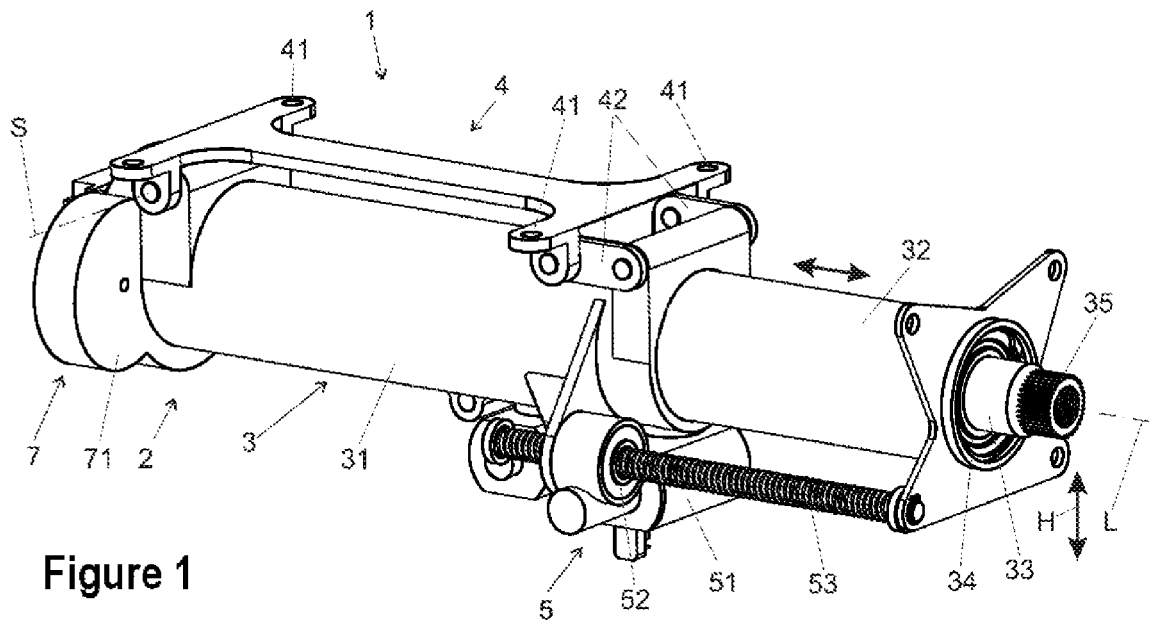
FIG. 1 is a diagrammatic perspective view of an example steering device for a motor vehicle with a feedback actuator.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a feedback actuator for a steering device of a motor vehicle. In some examples, such a feedback actuator may comprise a casing unit that has an outer casing that can be attached to a motor vehicle and in which an inner casing is received such that it can be adjusted telescopically in the longitudinal direction, in which inner casing a steering spindle is mounted such that it can be rotated about a longitudinal axis, an electric motor of a drive unit being arranged in an interior space of the casing unit, which electric motor has a stator that is fixed on the casing unit and a rotor that can be driven rotationally and has a rotor shaft that is coupled via a gear mechanism to the steering spindle.

In the case of a feedback actuator for a steering device of a motor vehicle, comprising a casing unit which has an outer casing which can be attached to a motor vehicle and in which an inner casing is received such that it can be adjusted telescopically in the longitudinal direction, in which inner casing a steering spindle is mounted such that it can be rotated about a longitudinal axis, an electric motor of a drive unit being arranged in an interior space of the casing unit, which electric motor has a stator which is fixed on the casing unit and a rotor which can be driven rotationally and has a rotor shaft which is coupled via a gear mechanism to the steering spindle, it is proposed according to the invention that the stator is fixed on the outer casing.

The rotor shaft is preferably oriented in a coaxial or axially parallel manner with respect to the longitudinal axis.

As a result of the fixing according to the invention of the stator, the motor is preferably arranged in the outer casing in a coaxial or axially parallel manner with respect to the longitudinal axis, and is fastened in the longitudinal direction, that is to say axially, and in a non-rotating manner with regard to rotation about the longitudinal axis. An advantageously compact overall design as in the prior art which forms the basis can be realized by way of the accommodation of the motor in the casing unit. By virtue of the fact that the drive unit is not, however, as previously fixed on the inner casing which is moved during adjusting, but rather is fixed on the stationary outer casing, the moving mass is reduced, and a more rapid adjustment can take place by way of a relatively lower drive power.

As a result of the stationary attachment of the motor to the casing unit, no electric lines which can be moved spatially during adjustment are required, as a result of which the operational reliability is increased and the production and assembly complexity is decreased.

According to the invention, the motor of the drive unit is attached within the outer casing. The gear mechanism which is connected to the motor shaft can admittedly also be arranged within the outer casing, but does not necessarily have to be. In particular, it is not necessary that gear mechanisms are accommodated within the tight interior space within the inner casing. It can be particularly advantageous that the gear mechanism is arranged at least partially outside the interior space of the outer casing. As a result, a greater amount of installation space can be provided which is not limited by way of the dimensioning of the interior space of the outer or inner casing. The construction and manufacturing complexity can be reduced by virtue of the fact that a highly durable, miniaturized construction is not required.

The stator can be fixed on an inner side which delimits the interior space of the outer casing, for example a casing face or axial end side. A releasable or non-releasable connection can be configured which can be optimized with regard to low manufacturing and assembly complexity. Positively locking and/or integrally joined connecting means can preferably be used, for example screw connections, riveted connections, adhesive bonds or welded bonds, or else flanged connections, caulked connections or the like.

The outer casing and/or the inner casing are/is preferably of tubular configuration at least in sections. A tubular configuration is to be understood to mean all hollow profiles, and is not restricted to a circular-cylindrical cross section. For example, as is known per se, an outer or inner casing tube with a round or non-round cross section, for example a triangular, square, hexagonal, octagonal or polygonal cross section, can be used as outer and inner casing tube.

It can be provided in one advantageous development that a further casing tube is arranged as intermediate casing tube between the outer casing and the inner casing, which further casing tube can be adjusted with respect to the outer casing and the inner casing. An arrangement of this type is also called a multiple telescopic arrangement. Further casing tubes can also be provided.

It is one advantageous embodiment that the motor has an outer cross section which is smaller than an inner cross section of the inner casing. The outer cross section of the motor as a rule corresponds to the outer cross section of the stator. By virtue of the fact that this is smaller than an axially open inner cross section of the inner casing which, to this end, can preferably be configured as an inner casing tube, it is possible that the motor dips at least partially into an interior space of the inner casing, in the retracted state, in which the inner casing is pushed completely or at least partially into the outer casing. As a result, the casing unit can be of particularly compact design.

It can be provided that a coaxial intermediate space is configured between the motor and the outer casing, in which intermediate space the inner casing can be received. The intermediate space is situated between the stator of the motor and the inner side of the outer casing, and extends at least in sections in the longitudinal direction over the motor. The intermediate space provides an axial movement space, into which the inner casing can be pushed during adjustment in the longitudinal direction. Here, the intermediate space is of ring-like configuration. The motor can preferably have an outer cross section which is smaller than an inner cross section at the front end, which dips into the outer casing, of the inner casing tube which is open on the end side. By virtue of the fact that the motor can dip axially from the front into the inner casing tube during pushing of the inner casing into the outer casing in the longitudinal direction, a short length in the maximum compressed stowage position of the casing unit can be realized.

It can be provided that the drive unit is coupled to the steering spindle via a shaft arrangement, the length of which can be varied in the longitudinal direction. Via the shaft arrangement, the torque which is generated by the drive unit is transmitted to the steering spindle. As a result of the adjustable-length shaft arrangement, the axial spacing which can be varied during adjustment and is different in different adjusting states of the casing unit between the outer casing and the inner casing can be compensated for, with the result that the transmission of torque is ensured in every longitudinal setting of the casing unit. Variable-length shaft arrangements which are known per se can be used, for example telescopic splined shafts or non-round shafts, in the case of which in each case an inner shaft with a non-round cross section engages in a torque-transmitting manner into a corresponding inner cross section of a hollow or outer shaft such that it can be displaced axially. In the case of the invention, for example, the steering spindle has a hollow shaft, into which an inner shaft which can be driven rotationally by the drive unit engages, or vice versa. In contrast to the prior art, merely that part of the shaft arrangement which can be moved axially relative to the outer casing is mounted as part of the steering spindle in the inner casing, as a result of which the entire moving mass of the inner casing during adjustment can be designed to be relatively small in an advantageous manner. At any rate, this moving mass is as a rule considerably smaller than if the drive unit is connected to the inner casing, as in the prior art.

It can preferably be provided that the motor is arranged in an end region of the outer casing, which end region faces away from the inner casing in the longitudinal direction. According to the invention, the stator is correspondingly fixed in a front (in the driving direction) region of the outer casing.

As a result, the drive unit can be mounted on the outer casing from the front end side, preferably on an outer casing tube. The uncomplicated construction and the simple assembly are advantageous. Moreover, advantageous possibilities result for attaching the gear mechanism on the end side outside the casing tube, for example flange-connecting it to the outer casing tube.

It can be provided that the gear mechanism is arranged at least partially outside the interior space of the outer casing. As a result, the external dimensions of the gear mechanism, for example the outer cross section, can be greater than the inner cross section of the outer casing tube and, in particular, of the even smaller inner cross section of the inner casing. The gear mechanism can project to the outside beyond the outer casing, and can be accommodated, for example, in a gear mechanism housing which is fastened to the outer casing. For example, the gear mechanism can be attached on the end side of the outer casing tube, preferably axially on the front end side at the front end, for example in a gear mechanism housing, it being possible for the motor shaft to be coupled to a coaxial input shaft of the gear mechanism. It is advantageous here that the overall design and the dimensions of the gear mechanism can be adapted simply to the required transmission properties and the installation space which is available in the vehicle. For example, single-stage, two-stage or multiple-stage gear mechanisms can be realized, even in different gearwheel mechanism designs, belt drive designs, planetary gear mechanism designs or other gear mechanism designs. The use of a continuously variable transmission is likewise conceivable and possible. It is simply possible here for gear mechanisms with different characteristics to be mounted on a casing unit for adaptation to different vehicle types and uses. As a result, the flexibility of the manufacturing is increased.

One advantageous development can provide that the rotor shaft is configured as a hollow shaft, through which an output shaft of the gear mechanism or the steering spindle is guided coaxially and is coupled to the steering spindle. The rotor shaft which is coaxial with respect to the longitudinal axis can be connected to the input shaft of the gear mechanism, for example, through an opening of the outer casing, for example a front end-side axial opening of an outer casing tube. The gear mechanism can be attached at the front end of the outer casing tube, for example, as in the above-described embodiment, an input shaft being coupled to the rotor shaft. The input shaft interacts with the output shaft via transmission-specific gear mechanism members such as intermediate gears, intermediate shafts or the like. The output shaft is likewise arranged coaxially with respect to the longitudinal axis, and is guided axially to the inside into the outer casing through the rotor shaft which is configured as a hollow shaft, and is connected to the steering spindle, or a shaft part of the steering spindle is guided toward the outside out of the outer casing through the rotor shaft and is coupled to the output shaft. A particularly compact overall design can be realized by way of the coaxial arrangement of the rotor shaft and the output shaft.

An electric control unit can be attached to the outer casing or to the gear mechanism housing. This electric control unit can have electric control and connecting means for operating the motor. A compact overall design can advantageously be configured in this way.

The gear mechanism, which can be of single-stage or multiple-stage configuration, can preferably have a transmission ratio (overall transmission ratio) of between 1:3 and 1:25, particularly preferably of between 1:5 and 1:15. It can be configured, for example, as a single-stage or multiple-stage spur gear mechanism, belt drive or other gear mechanism. It can be advantageous that the gear mechanism has a gear mechanism housing which is connected releasably or non-releasably to the outer casing. As a result, a gear mechanism can be provided and mounted simply as a gear mechanism assembly. It is also conceivable and possible for different gear mechanism assemblies with transmission properties which are adapted to different uses to be provided, which gear mechanism assemblies can be mounted on a casing unit as required in order to realize different feedback characteristics.

It can be provided that a motorized adjustment drive is arranged between the inner casing and the outer casing. The adjustment drive preferably comprises a linear drive which is active between the inner casing and the outer casing. As a result, a motorized length adjustment of the casing unit can take place. For example, the adjustment drive can have a rotational or plunger spindle drive which can be driven by way of an electric actuating motor and acts on the inner casing and outer casing.

For attachment in a motor vehicle, it can be provided that the casing unit is held by a supporting unit which can be connected to a vehicle body. The supporting unit serves to hold the casing unit, specifically to fix the outer casing in the longitudinal direction relative to the motor vehicle body. For height adjustment, the casing unit can be attached such that it can be adjusted in the vertical direction transversely with respect to the longitudinal axis relative to the supporting unit, in order for it to be possible for the height of the steering wheel to be set relative to the driver's position. The height adjustment can take place by way of pivoting of the casing unit about a horizontal pivot axis in the supporting unit, to be precise either manually, or likewise by means of a motorized actuating drive in a similar manner to that described in the preceding text for the length adjustment.

In the different figures, identical parts are always provided with the same designations, and are therefore also as a rule named or mentioned in each case only once.

Figure 2:
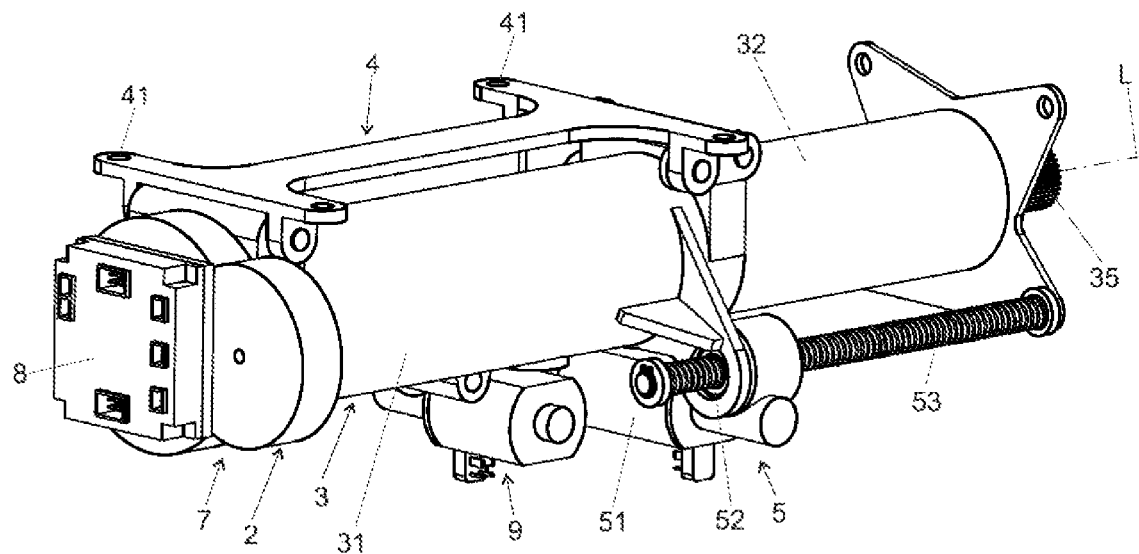
FIG. 2 is a perspective view of the steering device according to FIG. 1.

FIGS. 1 and 2 diagrammatically show perspective outside views of a steering input apparatus 1 for a motor vehicle (not shown) in the form of an adjustable-length steering column which has a feedback actuator 2 according to the invention. In detail, FIG. 1 shows a view obliquely from rear left (in relation to the driving direction), and FIG. 2 shows a view obliquely from front left, that is to say on the same side counter to the driving direction.

The feedback actuator 2 has a casing unit 3, with a substantially tubular outer casing 31 (also called an outer casing tube or guide bracket) which is open toward the rear and in which a tubular inner casing 32 (also called an inner casing tube or an inner casing) is received coaxially with respect to a longitudinal axis L, which inner casing 32 can be displaced in the direction of a central longitudinal axis L in the longitudinal direction or in an axially telescopic manner, as indicated by way of a double arrow.

A steering spindle 33 is mounted in a bearing 34 such that it can be rotated about the longitudinal axis L in the inner casing 32. At the rear end which faces the driver's position, the steering spindle 33 has a receiving section 35 for attaching a steering wheel (not shown).

The steering spindle 33 is configured as a variable-length shaft with an inner shaft 36 which has the receiving section 35 and is mounted in the bearing 34, which inner shaft 36 dips into a hollow shaft 37 in a torque-transmitting and axially displaceable manner. The inner shaft 36 and the hollow shaft 37 can have corresponding non-round cross sections or longitudinal spline systems for the transmission of torque in a manner known per se.

A supporting unit 4 has fastening openings 41 for fastening to a vehicle body (not shown) of the vehicle. In its front region, the outer casing 31 is connected to the supporting unit 4 such that it can be pivoted about a horizontal pivot axis S which lies transversely with respect to the longitudinal axis L. In the rear region, a pivoting lever 42 is articulated on the outer casing 31 and the supporting unit 2, with the result that pivoting of the casing unit 3 relative to the supporting unit 4 is made possible, a height adjustment of the steering wheel which is attached to the receiving section 35 being made possible in the height direction H, as indicated by way of the double arrow.

A length adjustment drive 5 which is configured as a linear plunger spindle drive in the example which is shown comprises a spindle nut 52 which can be driven rotationally by an actuating motor 51, is supported in the longitudinal direction on the outer casing 31, and into which a threaded spindle 53 engages which is arranged parallel to the longitudinal axis L and is supported in the longitudinal direction on the inner casing 32. By way of relative rotation by means of the actuating motor 51, the threaded spindle 53 and the spindle nut 52 are moved in the longitudinal direction relative to one another, as a result of which the inner casing 32 can be retracted or extended in a telescoping manner for length adjustment.

Figure 5:
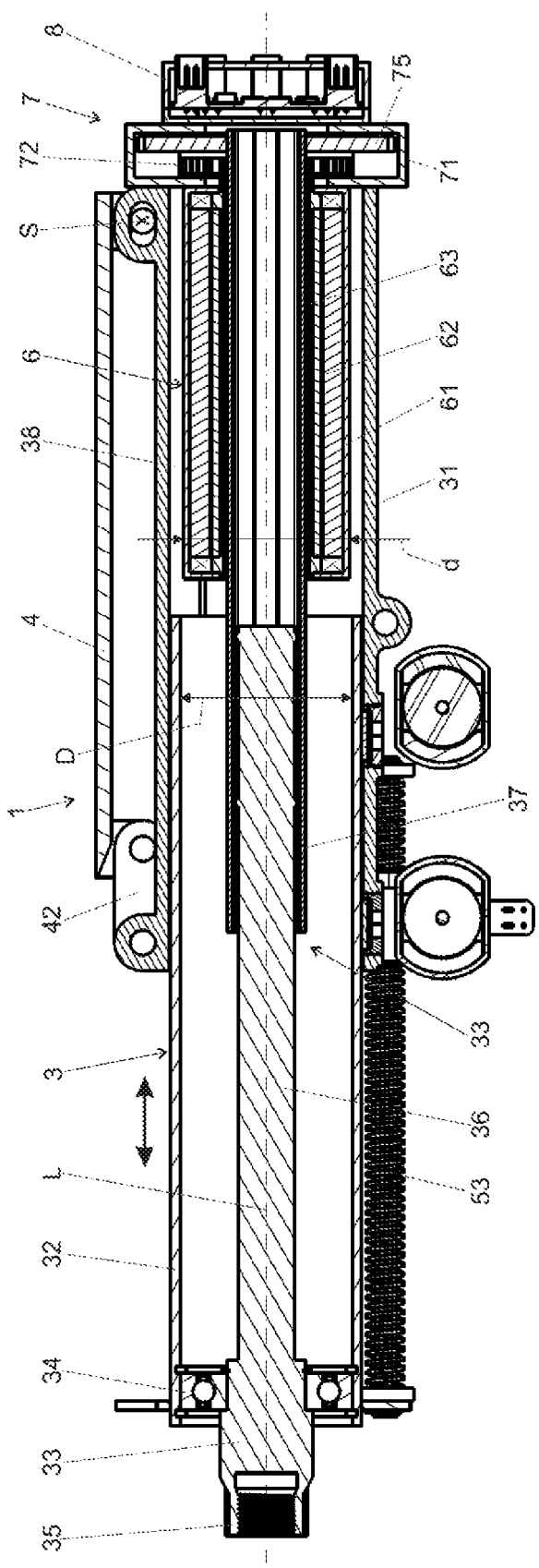
FIG. 5 is a perspective view of the steering device as in FIG. 1, in a partially open diagrammatic partial illustration.

FIG. 5 shows a longitudinal section through the casing unit 3. An electric motor 6 of the feedback actuator 2 has a stator 61 which coaxially surrounds a rotor 62 which can be driven rotationally therein. The rotor 62 has a rotor shaft 63 which is configured as a hollow shaft and is arranged coaxially with respect to the longitudinal axis L. The motor 6 is connected to the casing unit 3 by virtue of the fact that the stator 61 is fixed in the longitudinal direction coaxially in the front region interior space of the outer casing 31 and in a non-rotational manner with regard to rotation about the longitudinal axis L.

At the rear end, a gear mechanism 7 is fastened on the end side outside the interior space to the outer casing 31. The gear mechanism 7 has a gear mechanism housing 71 which, as shown, is fastened on the front axial opening of the outer casing. Here, as in the example which is shown, the stator 61 can be connected axially to that end wall of the housing 71 which faces the outer casing 31, as a result of which the motor 6 is positioned and fixed in the interior space. The steering spindle 33 is arranged rotatably within the rotor shaft 63, the hollow shaft 37 being guided axially through the rotor shaft 63 without contact of the rotor shaft 63 and the hollow shaft 37 occurring.

Figure 3:
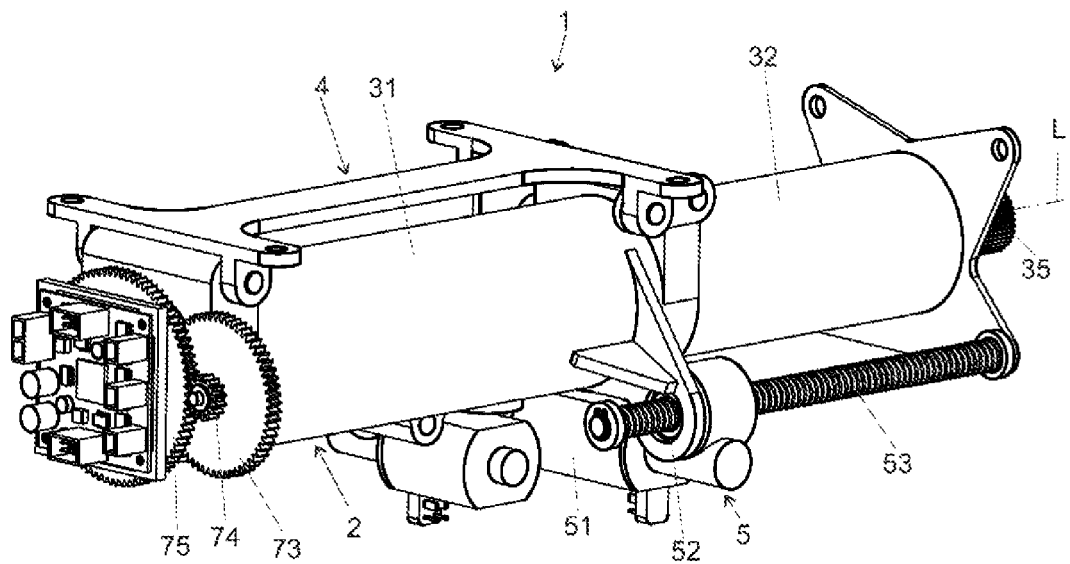
FIG. 3 is a longitudinal sectional view through a steering device according to FIG. 1 or 2.
Figure 4:
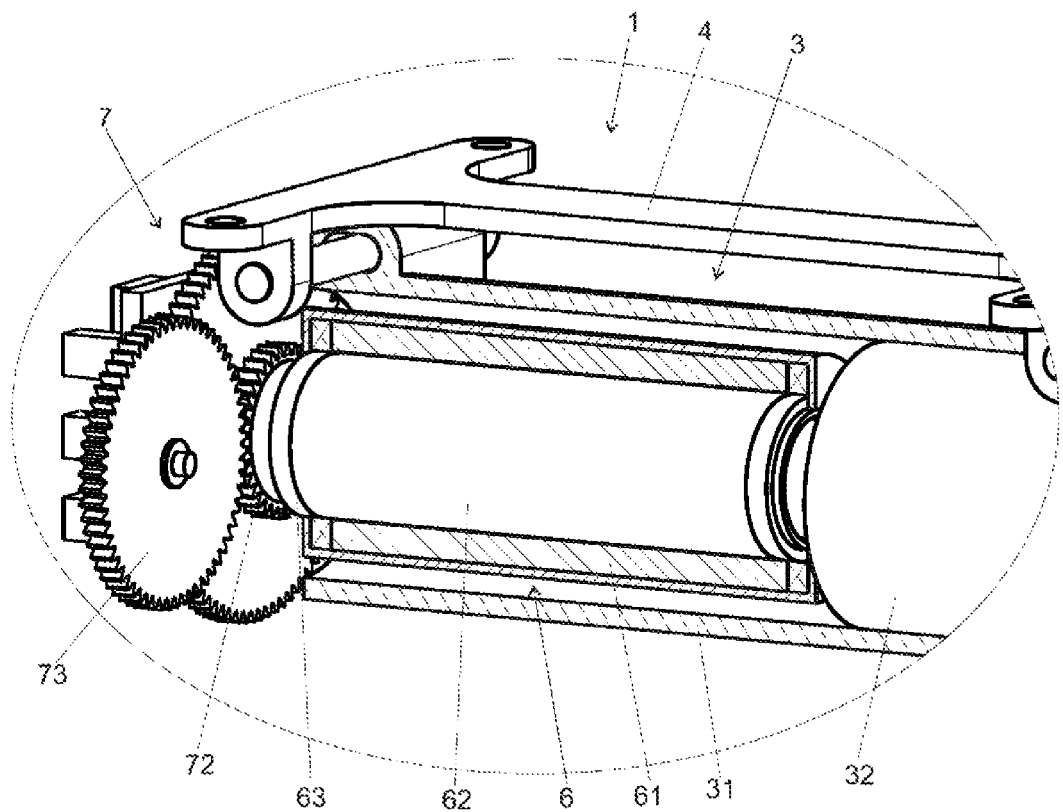
FIG. 4 is a perspective view of a steering device as in FIG. 2, in a partially open diagrammatic illustration.

The rotor shaft 63 projects rearward axially out of the interior space of the outer casing 31, and is coupled to an input gear 72 of the gear mechanism 7, which input gear 72 is mounted coaxially with respect to the longitudinal axis L and is configured as a spur gear. It can be seen from the diagrammatic perspective illustrations of FIGS. 3 and 4, in which the gear mechanism housing 71 is omitted for improved clarity, that the input gear 72 meshes with a first intermediate gear 73 which is mounted eccentrically from the longitudinal axis L and is connected fixedly for conjoint rotation to a second intermediate gear 74 with a lower number of teeth, which second intermediate gear 74 engages into an output gear 75.

The output gear 75 is mounted coaxially with respect to the longitudinal axis L, and is coupled in a torque-transmitting manner to the steering spindle 33 via the hollow shaft 37.

A rotation of the rotor 62 by way of actuation of the motor 6 is converted via the gear mechanism 7 into a stepped-down, slower rotation of the output gear 75 and therefore of the steering spindle 33. The transmission ratio which is determined by way of the numbers of teeth of the gear wheels 72, 73, 74 and 75 can lie in the range from 1:3 to 1:25, preferably in the range from 1:5 to 1:15. As can be seen from the examples which are shown, the gear mechanism 7 has an outer cross section which is greater than the inner cross section of the outer casing 31. Here, a compact shape and an optimized adaptation to the installation space which is available in the motor vehicle can nevertheless take place by way of the integration of the motor 6 into the interior space of the outer casing 31 and the end-side arrangement of the gear mechanism 7.

The stator 61 and therefore the motor 6 preferably have an external diameter d which is smaller than the internal diameter D of the inner casing 32, with the result that the motor 6 has an outer cross section which is smaller than an inner cross section of the inner casing 31. As a result, during contraction of the casing unit 3, that is to say from left to right in FIG. 5, the inner casing 32 can dip in the longitudinal direction into the coaxial intermediate space 38 which is formed between the motor 6 and the inner wall of the outer casing 31. As a result, a short stowage length can be realized.

The gear mechanism housing 71 can be connected releasably or non-releasably to the outer casing 31. The connection can take place by means of an integrally joined and/or positively locking and/or non-positive connection.

An electric control unit 8 for actuating the motor 6 can be attached to the gear mechanism housing 71. It can additionally be provided that the control unit 8 likewise actuates the length adjustment drive 5.

For height adjustment in the vertical direction H, a height adjustment drive 9 can be provided which in principle can be of similar configuration to the length adjustment drive 5 as a spindle drive, and can act, for example, between the outer casing 31 and the pivoting lever 42, or in some other way between the casing unit 3 and the supporting unit 4.

LIST OF DESIGNATIONS

1 Steering input apparatus
2 Feedback actuator
3 Casing unit
31 Outer casing
32 Inner casing
33 Steering spindle
34 Bearing
35 Receiving section
36 Inner shaft
37 Hollow shaft 38 Intermediate space
4 Supporting unit
41 Fastening opening
42 Pivoting lever
5 Length adjustment drive
51 Actuating motor
52 Spindle nut
53 Threaded spindle
6 Motor
61 Stator
62 Rotor
63 Rotor shaft
7 Gear mechanism
71 Gear mechanism housing
72 Input gear
73,74 Intermediate gear
75 Output gear
8 Control unit
9 Height adjustment drive
D, d External diameter
L Longitudinal axis
S Pivot axis

What is claimed is:

1. A feedback actuator for a steering device of a motor vehicle, the feedback actuator comprising:
   a casing unit having
      an outer casing that is attachable to the motor vehicle, and
      an inner casing that is received in the outer casing such that the inner casing is telescopically adjustable in a longitudinal direction;
   a steering spindle mounted in the inner casing such that the steering spindle is rotatable about a longitudinal axis; and
   an electric motor of a drive unit disposed in an interior space of the casing unit,
      wherein the electric motor includes
         a stator that is fixed on the outer casing, and
         a rotor that is configured to be driven rotationally and has a rotor shaft that is coupled via a gear mechanism to the steering spindle;
      wherein the electric motor has an outer s section that is smaller than an inner cross section of the inner casing.

2. The feedback actuator of claim 1 wherein at least some sections of the outer casing are tubular.

3. The feedback actuator of claim 1 wherein at least some sections of the inner casing are tubular.

4. The feedback actuator of claim 1 wherein a coaxial intermediate space is configured between the electric motor and the outer casing, wherein the coaxial intermediate space is configured to receive the inner casing.

5. The feedback actuator of claim 1 wherein the drive unit is coupled to the steering spindle via a shaft arrangement, wherein a length of the shaft arrangement is variable in the longitudinal direction.

6. The feedback actuator of claim 1 wherein the electric motor is disposed in an end region of the outer casing, wherein the end region faces away from the inner casing in the longitudinal direction.

7. The feedback actuator of claim 1 wherein the gear mechanism is disposed at least partially outside the interior space of the outer casing.

8. The feedback actuator of claim 1 wherein the gear mechanism is attached to the outer casing on an end side.

9. The feedback actuator of claim 1 wherein the rotor shaft is configured as a hollow shaft, wherein an output shaft of the gear mechanism or the steering spindle is guided coaxially through the hollow shaft and is coupled to the steering spindle.

10. The feedback actuator of claim 1 wherein the gear mechanism has a transmission ratio of between 1:3 and 1:25.

11. The feedback actuator of claim 1 comprising a motorized adjustment drive disposed between the inner casing and the outer casing.

* * * * *